(12) United States Patent
Villiers

(10) Patent No.: US 12,665,924 B1
(45) Date of Patent: Jun. 23, 2026

(54) DENIAL OF SERVICE ATTACK MITIGATION BASED ON COMPUTE NODE FAILURES

(71) Applicant: Amazon Technologies, Inc., Seattle, WA (US)

(72) Inventor: Eric Villiers, Las Vegas, NV (US)

(73) Assignee: Amazon Technologies, Inc., Seattle, WA (US)

( * ) Notice: Subject to any disclaimer, the term of this patent is extended or adjusted under 35 U.S.C. 154(b) by 499 days.

(21) Appl. No.: 18/098,414

(22) Filed: Jan. 18, 2023

(51) Int. Cl.
*G06F 11/00* (2006.01)
*G06F 12/14* (2006.01)
*G06F 12/16* (2006.01)
*G08B 23/00* (2006.01)
*H04L 9/40* (2022.01)

(52) U.S. Cl.
CPC ................................ *H04L 63/1458* (2013.01)

(58) Field of Classification Search
CPC .................................................. H04L 63/1458
USPC ........................................................... 726/23
See application file for complete search history.

(56) References Cited

U.S. PATENT DOCUMENTS

| | | | | |
|---|---|---|---|---|
| 11,038,745 | B1 * | 6/2021 | Vasquez | .................. H04L 69/40 |
| 2018/0129692 | A1 * | 5/2018 | Jagtiani | ................... G06F 16/23 |
| 2021/0306371 | A1 * | 9/2021 | Majkowski | ........... G06F 3/0237 |
| 2022/0014377 | A1 * | 1/2022 | Vasudevan | .............. G06F 21/64 |

* cited by examiner

*Primary Examiner* — Jeffrey C Pwu
*Assistant Examiner* — Samuel Ambaye
(74) *Attorney, Agent, or Firm* — Kilpatrick Townsend & Stockton LLP

(57) ABSTRACT

Denial of service attack mitigation based on compute node failures is described herein. In an example, a system can include a first point of presence (POP) that is located in a first region and a server that is located in a second region. The system can also include a first compute node that is located in the first region and communicatively coupled with the first POP or that is located in the second region and communicatively coupled with the server and has a smaller capacity to handle requests than each of the POP and the server. The first compute node is configured to receive a request of the POP indicating a network address of the server, determine data to send the request along a network path to the server, and send the request along the network path based on the data.

20 Claims, 15 Drawing Sheets

<u>1202</u>
Receive, by a compute node located in a first region, a request of a point of presence that is located in the first region and communicatively coupled to the compute node <u>1204</u>
Determine, by the compute node, data to send the request along a network path to a server that is located in a second region <u>1206</u>
Determine, based on the data, that the request is to be sent to a second compute node that is located in the second region <u>1208</u>
Send, by the compute node, the request along the network path based on the data <u>1210</u>
Receive additional requests and cause a failure

FIG. 12

<u>1302</u>
Receive, by a first compute node located in a first region and communicatively coupled to a server, a request of a point of presence that is located in a second region and communicatively coupled to a second compute node <u>1304</u>
Determine, by the first compute node, data to send the request along a network path to the server <u>1306</u>
Send, by the first compute node, the request along the network path based on the data <u>1308</u>
Receive additional requests and cause a failure

FIG. 13

┌─────────────────────────────────────────┐
│　　　　　　　　　1402
│　Determine a set of characteristics of a request of a point of
│　　　　　　　　　presence
└─────────────────────────────────────────┘

DENIAL OF SERVICE ATTACK MITIGATION BASED ON COMPUTE NODE FAILURES

BACKGROUND

Operating an organization often involves the operation of and interaction with computer networks that interconnect numerous computing systems. Many computing systems may be co-located (e.g., as part of a local network) and/or located in multiple distinct geographical locations (e.g., connected via one or more private or public intermediate networks). For example, an organization may operate one or more data centers that house significant numbers of interconnected computing systems. Data centers may be private data centers that are operated by and on behalf of a single organization, public data centers that are operated by entities as businesses, and/or combination private/public data centers. It is common for data centers to be participants in a communications network, such as the Internet. Data centers may, for example, be used to provide services that are accessed from outside of the data centers.

BRIEF DESCRIPTION OF THE DRAWINGS

Various embodiments in accordance with the present disclosure will be described with reference to the drawings, in which:

FIG. 12 illustrates an example flow of an edge compute node performing DOS attack mitigation, according to an embodiment of the present disclosure;

FIG. 13 illustrates an example flow of an origin compute node performing DOS attack mitigation, according to an embodiment of the present disclosure;

DETAILED DESCRIPTION

Figure 1:
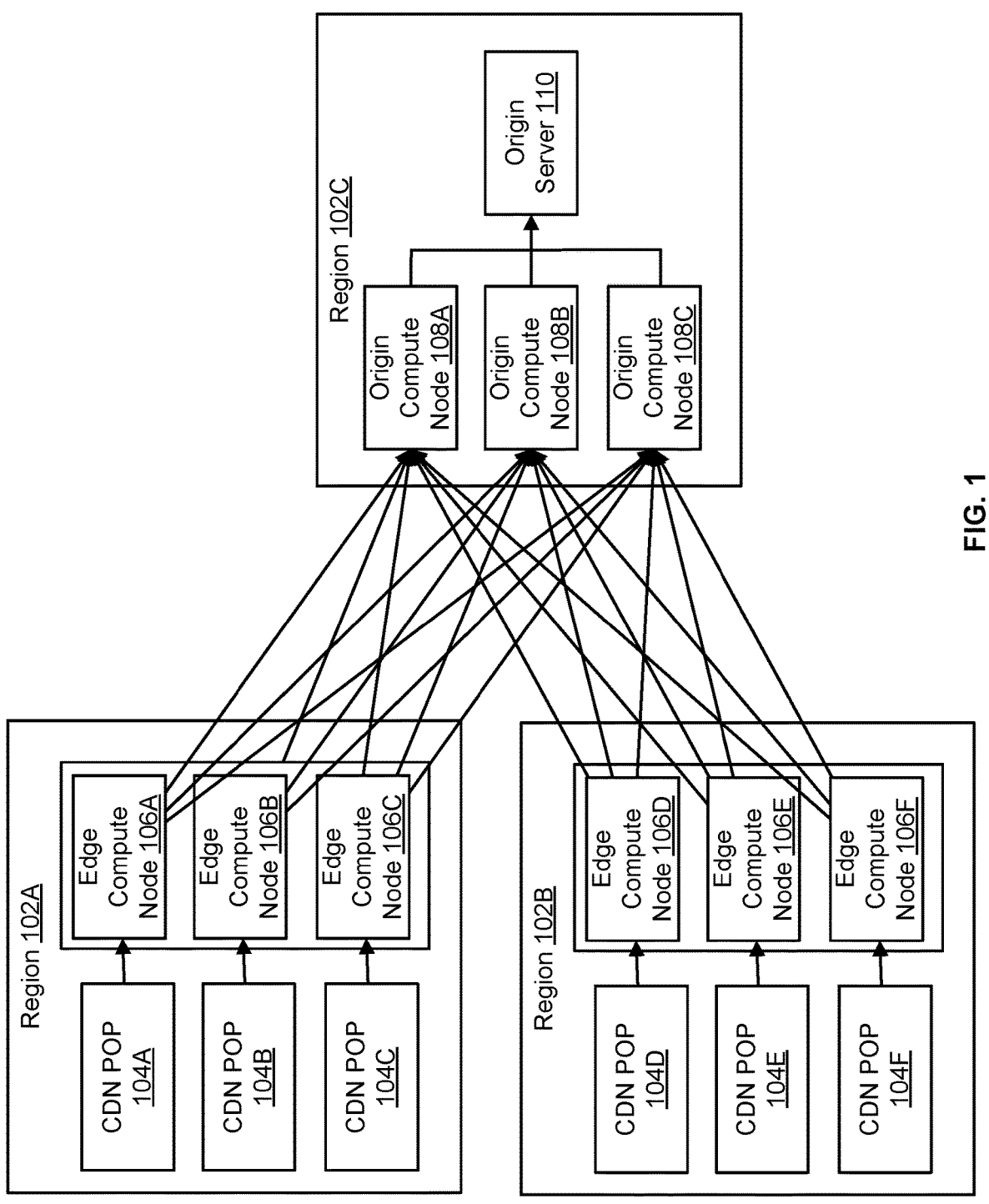
FIG. 1 illustrates an example of an infrastructure of data servers for hosting and providing computing services, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, denial of service (DOS) mitigation based on compute node failures. In an example, a system includes a point of presence (POP) that is located in a first region and a server that is located in a second region. The POP can indicate network addresses of a computing service (e.g., a web site) hosted by the server. The POP can receive requests for the computing service and communicate with one or more compute nodes (referred to herein as edge compute nodes) in the first region to send the requests to the server. The system can also include a one or more compute nodes (referred to herein as origin compute nodes) that are located in the second region and communicatively coupled with the server. The edge compute nodes have a smaller capacity to handle requests than the POP and the origin compute nodes have a smaller capacity to handle requests than the server. Either an edge compute node or an origin compute node can receive a request of the POP indicating the network address of the server, determine data to send the request along a network path to the server, and send the request along the network path based on the data. The smaller capacity can be designed according to expected number of requests over a time interval (e.g., these requests can correspond to expected traffic of clients). Given the smaller capacity, if the number of requests within the time interval exceeds a certain threshold number, the relevant compute node (e.g., edge or origin compute node) can no longer handle the requests and would fail. This large number of requests can be caused due to a DOS attack. As such, by failing the compute node, the impact of the DOS attack can be limited to the traffic that this compute node would have otherwise handled, and does not impact the traffic handled by the remaining compute nodes. In other words, the computing service would still be available to and accessible to a large set of clients, while the impact of the DOS attack is mitigated to a small set of clients.

To illustrate, consider a server that hosts a web site and a botnet attempting to bring down the web site by sending a significant number of web requests to the server. The botnet may send the web requests through a single POP that forwards the requests to an edge compute node with a smaller processing capacity than the POP. If the edge compute node has insufficient processing capacity for the web requests, the edge compute node can fail the sending of the web requests. Alternatively, the botnet may send the web requests through multiple, distributed POPs, and each POP can forward the request to an edge compute node. From there, either the edge compute node or another compute node acting as a domain name system (DNS) server can determine hashes of the web requests and an origin compute node associated with each hash. Each origin compute node may be associated with a particular device, which may be indicated by the hash, so all of the web requests received from the botnet can be routed to the same origin compute node. The origin compute node may fail the sending of the web requests from the botnet if the edge compute node has insufficient processing capacity for the web requests. Thus, there are two layers of DOS attack mitigation prior to web requests reaching the server. Whereas the relevant compute node is failed, other compute nodes remain operable, thereby allowing the web site to remain accessible to many clients.

Embodiments of the present disclosure may provide technical improvements over conventional techniques for mitigating DOS attacks. For example, the use of both edge compute nodes and origin compute nodes provides protection against both single-POP attacks and distributed attacks. As such, a majority of DOS attacks can be thwarted before the attack reaches a server (referred to also as an origin server). The impact of the DOS attack is limited to failing a compute node and, thereby to only the traffic that would have been handled via the failed compute node instead of all the traffic to the server. In addition, spreading the edge compute nodes and the origin compute nodes between distinct regions may ensure that fewer clients attempting to reach the server are impacted when an edge compute node or an origin compute node exceeds its processing capacity and fails to send requests, thereby improving overall the user experience.

In the interest of clarity of explanation, various embodiments are described herein in connection with web sites. However, the embodiments are not limited as such. Instead, the embodiments similarly apply to any computing service that can be remotely accessed by clients. A computing service can be subject to a denial of service attack, or any other type of attack that renders the computing service inaccessible to clients by overwhelming the underlying computing system with requests for the computing service. The embodiments of the present disclosure enable the computing service to be still provided (maybe not to all clients) in these situations by failing a limited set of computing nodes of the computing system.

FIG. 1 illustrates an example of an infrastructure of data servers for hosting and providing computing services, according to an embodiment of the present disclosure. In an example, a computing service can be provided by means of a web site hosted on a set of web servers. Various geographic regions can include data centers that communicate over a network to provide web sites to devices requesting the web sites. Points of presence (POPs) may be, but are not necessarily, co-located with a data center.

As illustrated in FIG. 1, a first data center includes content data network (CDN) POPs 104A-C and edge compute nodes 106A-C and is located in a region 102A, a second data center includes CDN POPs 104D-F and edge compute nodes 106D-F and is located in region 102B, and a third data center includes origin compute nodes 108A-C and origin server 110 and is located in region 102C. As an example, region 102A may be Southern California, region 102B may be Singapore, and region 102C may be Virginia. Each of the data centers can be communicatively coupled via a network. The edge compute nodes 106A-F and the origin compute nodes 108A-C may be configured as proxy servers.

Each CDN POP 104A-F is illustrated as being in communication with a single edge compute node 106A-F, and each edge compute node 106A-F is illustrated as being in communication with each origin compute node 108A-C. The edge compute nodes 106A-F may be isolated from each other (e.g., by not providing a network path between them), and the origin compute nodes 108A-C may be isolated from each other. The CDN POPs 104A-F can indicate a network address (e.g., an internet protocol (IP) address) of the origin server 110, which hosts a web site. When the web site is launched for the first time, or when a change is made to the web site (e.g., moved to a different origin server, new pages added, new IP address, etc.), it takes time before the web site is cached by the CDN POPs 104A-F. Until the web site is cached, requests for the web site can be sent by the CDN POPs 104A-F to the origin server 110. During at least that time, the infrastructure may be vulnerable to a denial-of-service (DOS) attack, which can bring the web site down (e.g., no longer accessible to clients).

A client (e.g., software application) of a device (e.g., laptop, smartphone, desktop, etc.) may send a web request for the web site using the network address of the origin server 110. For instance, CDN POP 104A may receive the web request for the web site, and the CDN POP 104A can include a translation table (or some other mapping information) that indicates the web request for the web site is to be sent to the edge compute node 106A. The CDN POP 104A forwards the web request to the edge compute node 106A. The edge compute node 106A also includes a translation table that indicates the web request for the web site is to be sent to origin compute node 108A. The web request may be sent from the edge compute node 106A to the origin compute node 108A based on data that associates a set of characteristics of the web request with an identifier of the origin compute node 108A. The data may be a hash of traffic information of the web request. The edge compute node 106A forwards the web request to the origin compute node 108A. Similarly, the origin compute node 108A includes a translation table that indicates the web request for the web site is to be sent to the origin server 110. The origin compute node 108A forwards the web request to the origin server 110.

To mitigate DOS attacks, the processing capacity (e.g., central processing unit (CPU) capacity, number of concurrent network connections, memory capacity, etc.) of the edge compute nodes 106A-F and the origin compute nodes 108A-C can be set so that receiving a number of requests greater than the processing capacity is able to handle results in failure of the corresponding edge compute node 106A-F or origin compute node 108A-C. For example, the processing capacity of each of the edge compute nodes 106A-F may be smaller than the processing capacity of the associated CDN POP 104A-F. So, if CDN POP 104A has the processing capacity for 10,000 web requests within one minute, the edge compute node 106A may have the processing capacity for 5,000 web requests within one minute. The smaller capacity of an edge compute node can be defined based on expected requests of the corresponding CDN POP during a time interval. Additionally, the processing capacity of each of the origin compute nodes 108A-C may be smaller than the processing capacity of the origin server 110. So, if origin server 110 has the processing capacity for 8,000 web requests within one minute, the origin compute node 108A may have the processing capacity for 6,000 web requests within one minute. The smaller capacity of an origin compute node can be defined based on expected requests destined to the origin server 110 during the time interval.

Although FIG. 1 illustrates the implementation of edge compute cells and origin compute cells, the embodiments of the present disclosure are not limited as such. Instead, a possible implementation can use edge compute cells only or origin compute cells only. Further, depending on the distribution of origin servers and related computing services, for a same computing service hosted by two origin servers, one of the two origin servers can be associated with edge compute cells only, whereas the other origin server can be associated with origin compute cells only.

Figure 2:
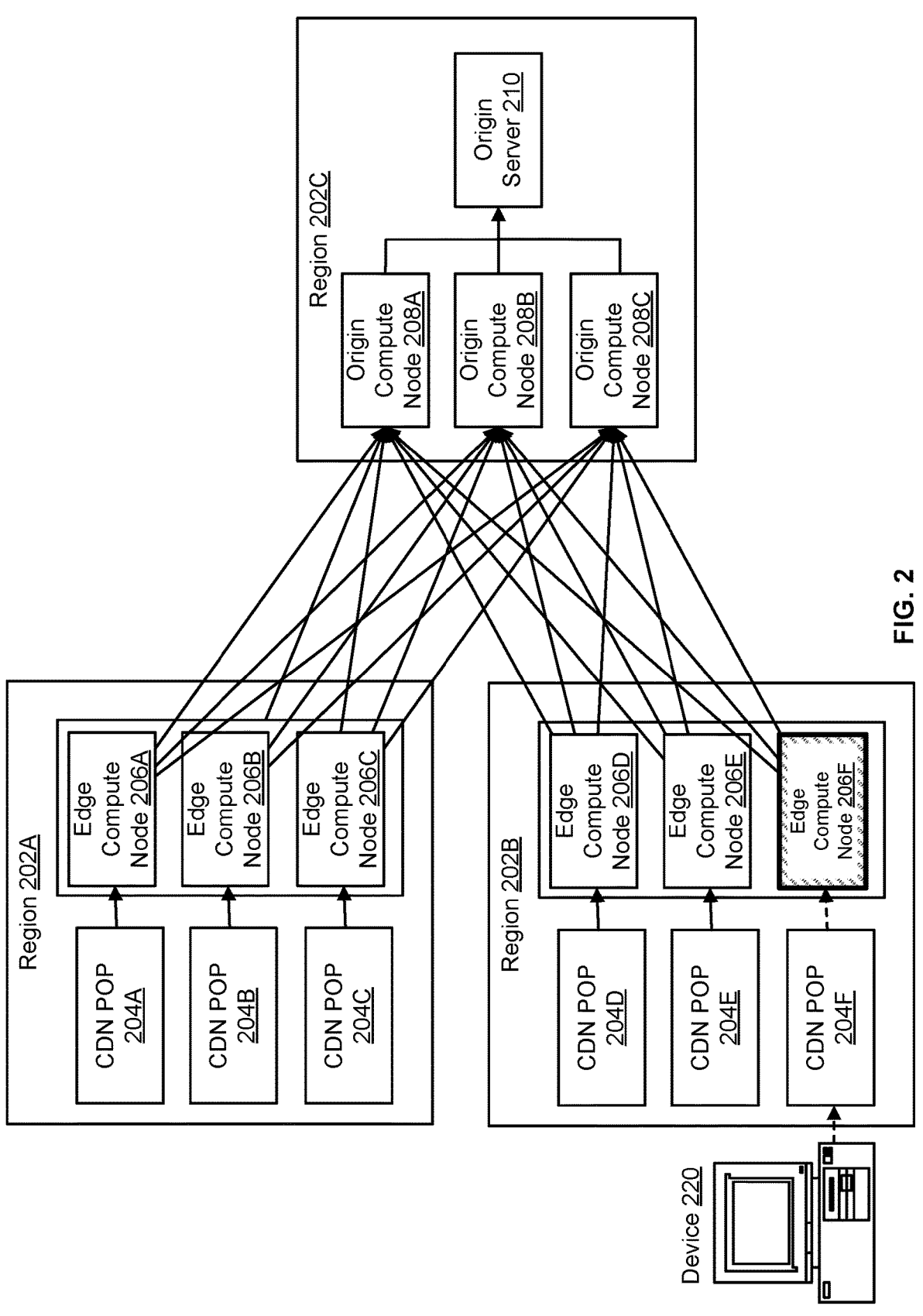
FIG. 2 illustrates an example denial of service based on an edge compute node failure, according to an embodiment of the present disclosure.

FIG. 2 illustrates an example of denial of service based on an edge compute node failure, according to an embodiment of the present disclosure. Similar to FIG. 1, CDN POPS 204A-C and edge compute nodes 206A-C are located in a region 202A, CDN POPs 204D-F and edge compute nodes 206D-F are located in region 202B, and origin compute nodes 208A-C and origin server 210 are located in region 202C.

Each CDN POP 204A-F is illustrated as being in communication with a single edge compute node 206A-F, and each edge compute node 206A-F is illustrated as being in communication with each origin compute node 208A-C. The CDN POPs 204A-F can indicate a network address of the origin server 210, which hosts a web site.

In an example, the CDN POP 204F is communicatively coupled with edge compute node 206F and has a larger processing capacity than the edge compute node 206F. For instance, if the CDN POP 204F has the processing capacity for 10,000 web requests in one minute, the edge compute node 206F may have the processing capacity for 3,000 web requests in one minute. The edge compute node 206F can receive web requests requesting the web site from a device 220, which is illustrated as being a desktop computer in FIG. 2. The network address of the origin server 210 indicated by the CDN POP 204F can be used in the web requests to request the web site. The device 220 may be a botnet attempting a DOS attack on the origin server 210, so the device 220 may send a high number of web requests for the web site to the CDN POP 204F with the intention of bringing down the web site. But the edge compute node 206F can prevent sending the web requests if the processing capacity of the edge compute node 206F is insufficient for handling the web requests. For example, if the CDN POP 204F receives 5,000 web requests for the web site in one minute from the device 220, the CDN POP 204F can send the 5,000 web requests to the edge compute node 206F. But, since the edge compute node 206F has insufficient processing power to handle the 5,000 web requests, the edge compute node 206F can fail and forego sending the web requests, thereby mitigating the DOS attack.

Said another way, if a botnet attacks a single IP, the traffic can go through a single CDN POP, there may already be some level of reduced capacity at that CDN POP, and the traffic then moves to the edge compute node associated with the CDN POP, where the edge compute node does not have enough capacity and fails. Other devices also using that CDN POP may also experience problems accessing the web site.

Even if an edge compute node, such as edge compute node 206F fails, devices in the region 202A using the CDN POPs 204A-C remain being served without interruption. In addition, devices in region 202B that use CDN POPS 204D-E can also remain being served without interruption. As such, only those devices using the CDN POP 204F that is associated with the edge compute node 206F may not receive web responses during the DOS attack.

Figure 3:
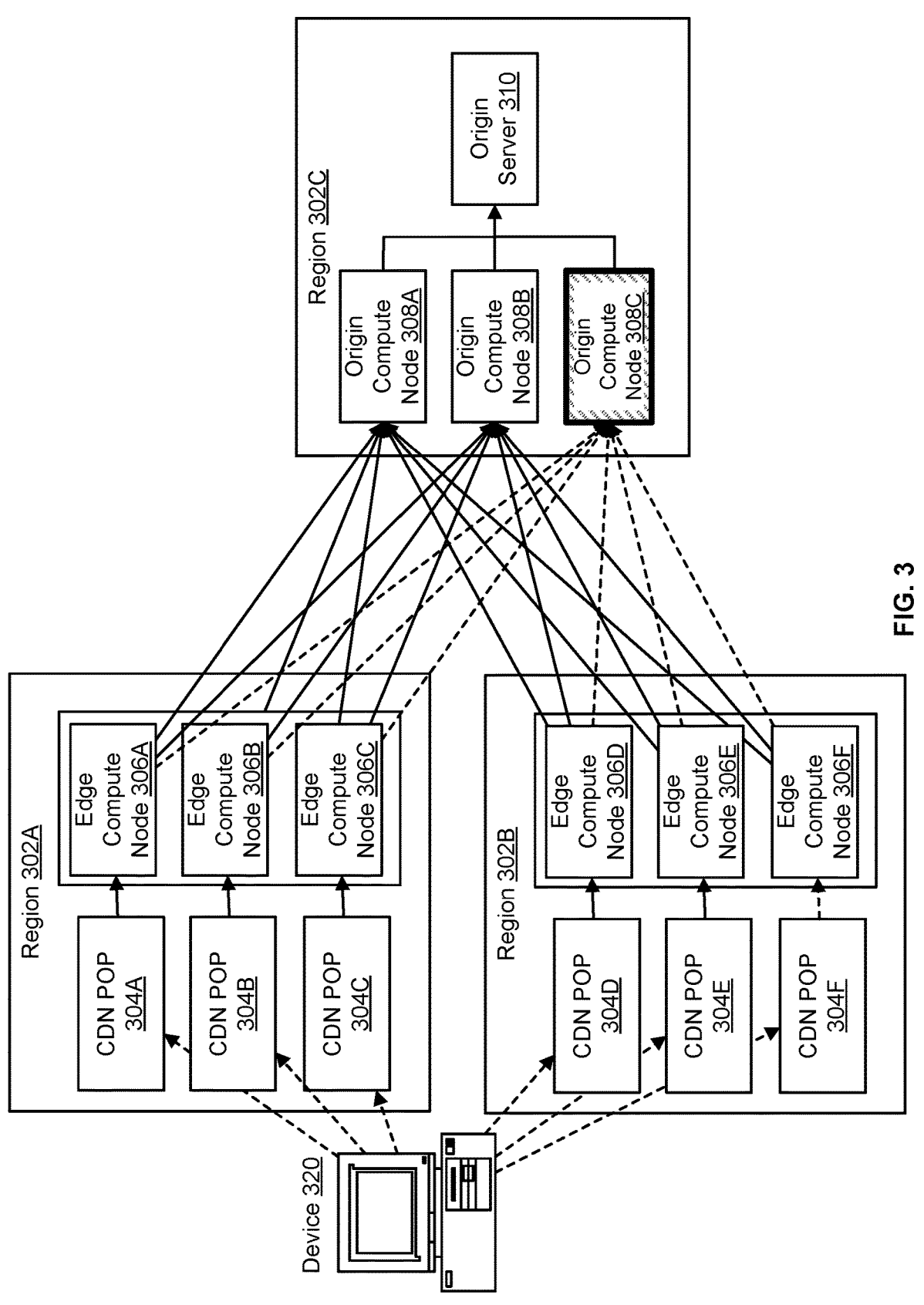
FIG. 3 illustrates an example denial of service based on an origin compute node failure, according to an embodiment of the present disclosure.

FIG. 3 illustrates an example denial of service based on an origin compute node failure, according to an embodiment of the present disclosure. Similar to FIG. 1, CDN POPs 304A-C and edge compute nodes 306A-C are located in a region 302A, CDN POPs 304D-F and edge compute nodes 306D-F are located in region 302B, and origin compute nodes 308A-C and origin server 310 are located in region 302C.

Each CDN POP 304A-F is illustrated as being in communication with a single edge compute node 306A-F, and each edge compute node 306A-F is illustrated as being in communication with each origin compute node 308A-C. The CDN POPs 304A-F can indicate a network address of the origin server 310, which hosts a web site.

In an example, a device 320, which is illustrated as being a desktop computer in FIG. 3, sends web requests for the web site to each of the CDN POPs 304A-F. The network address of the origin server 310 indicated by the CDN POPs 304A-F can be used in the web requests to request the web site. The device 320 may be a botnet attempting a DOS attack on the origin server 310, so the device 320 may send a high number of web requests for the web site with the intention of bringing down the web site.

The number of web requests received by each edge compute node 306A-F can be within the processing capacity of the edge compute node 306A-F, so each of the edge compute nodes 306A-F can receive the web requests from the CDN POPs 304A-F and then send the web requests to the corresponding origin compute nodes 308A-C based on characteristics of the web requests. For instance, each web request received from the device 320 may be sent to the origin compute node 308C. The origin compute node 308C can prevent sending the web requests if the processing capacity of the origin compute node 308C is insufficient for handling the received web requests. For example, if the origin compute node 308C receives 5,000 web requests for the web site in one minute from the device 320, the origin compute node 308C may fail sending the web requests to the origin server 310 if the origin compute node 308C only has processing capacity for 2,000 web requests in one minute.

In this example, the DOS attack is distributed and spread out and across multiple regions. No individual CDN POP or edge compute node is exceeding its capacity and so the web requests of the DOS attack are forwarded successfully. However, instead of distributing requests to the origin compute nodes indiscriminately, the origin compute node is selected based on a signature of the originating device. This may be similar to a map reduce, with the edge compute nodes doing mapping based on signatures, and a reduce layer being origin compute nodes that are designed to fail when load is too high. This means that the requests of the DOS attack centralize in a particular origin compute node that fails as a result. Other devices also matching the signature and assigned origin compute node may also fail.

Even if an origin compute node, such as origin compute node 308C, fails, devices that send web requests with characteristics associated with origin compute nodes 308A-B remain being served without interruption. As such, only those devices that send web requests with characteristics that are associated with the origin compute node 308C may not receive web responses during the DOS attack.

Figure 4:
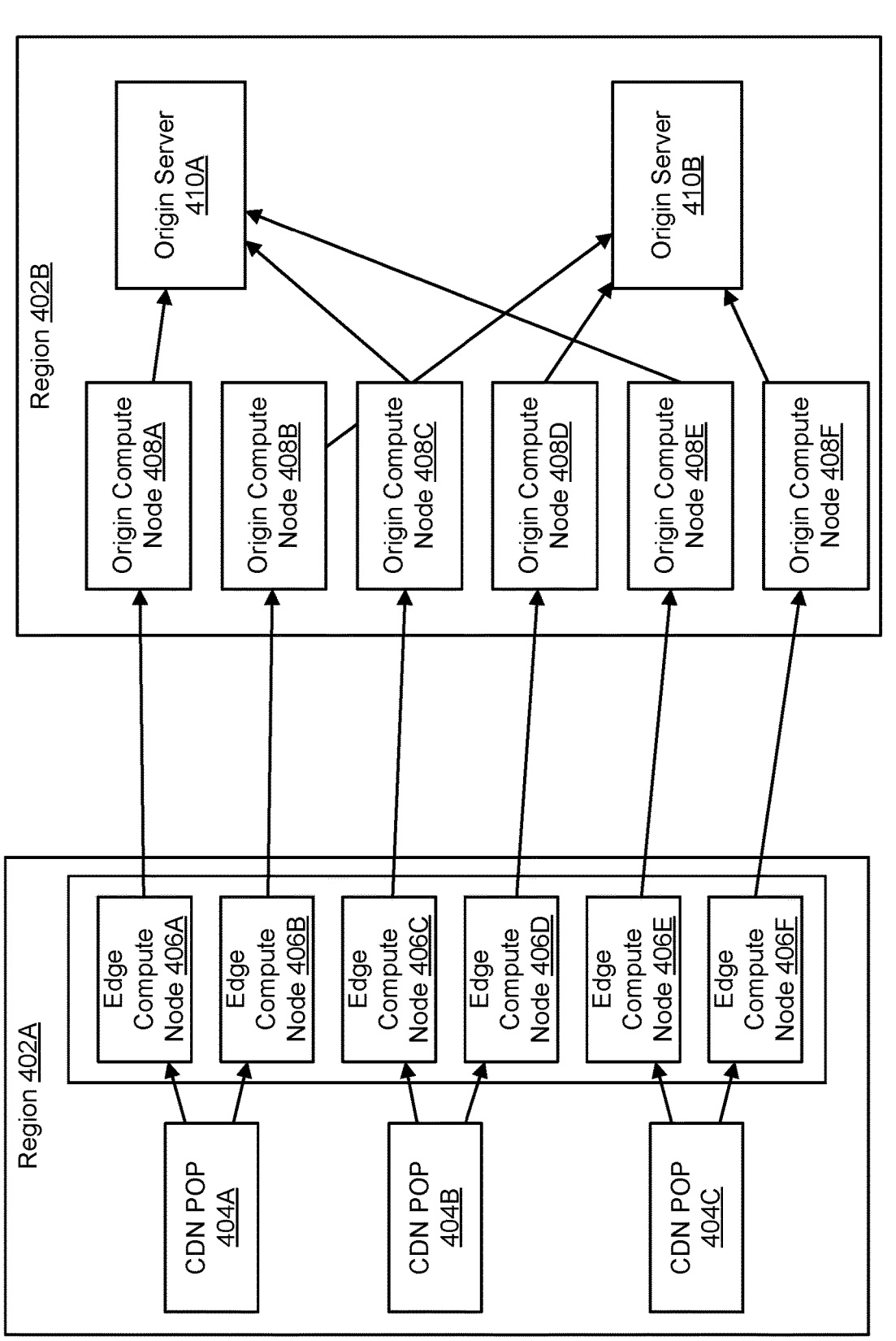
FIG. 4 illustrates an example of a system with multiple origin servers, where edge compute nodes and origin compute nodes are replicated, according to an embodiment of the present disclosure.

FIG. 4 illustrates an example of a system with multiple origin servers, where edge compute nodes and origin compute nodes are replicated, according to an embodiment of the present disclosure. A region 402A includes CDN POPs 404A-C and edge compute nodes 406A-F. A region 402B includes origin compute nodes 408A-F and origin servers 410A-B. Each of the origin servers 410A-B can host a web site, and the web site hosted by origin server 410A can be different than the web site hosted by origin server 410B. The edge compute nodes 406A-F and the origin compute nodes 408A-F being replicated can mean that there is no sharing of network paths for compute nodes that are associated with each origin server 410A-B.

As illustrated in FIG. 4, CDN POP 404A is communicatively coupled to edge compute nodes 406A-B. Edge compute node 406A can be associated with origin server 410A and indicate a network address of origin server 410A, while edge compute node 406B can be associated with origin server 410B and indicate a network address of origin server 410B. Edge compute node 406A is communicatively coupled to origin compute node 408A and edge compute node 406B is communicatively coupled to origin compute node 408B. Origin compute node 408A is communicatively coupled to origin server 410A and origin compute node 408B is communicatively coupled to origin server 410B. So, any web requests received by CDN POP 404A can be sent along a network path based on the network address of the web request, and traffic for the web sites can be isolated from each other.

Similarly, CDN POP 404B is communicatively coupled to edge compute nodes 406C-D and CDN POP 404C is communicatively coupled to edge compute nodes 406E-F. Edge compute node 406C and edge compute node 406E can be associated with origin server 410A and indicate a network address of origin server 410A, while edge compute node 406D and edge compute node 406F can be associated with origin server 410B and indicate a network address of origin server 410B. Edge compute node 406C is communicatively coupled to origin compute node 408C, edge compute node 406D is communicatively coupled to origin compute node 408D, edge compute node 406E is communicatively coupled to origin compute node 408E, and edge compute node 406F is communicatively coupled to origin compute node 408F. Origin compute nodes 408C/408E are communicatively coupled to origin server 410A and origin compute nodes 408D/408F are communicatively coupled to origin server 410B.

Figure 5:
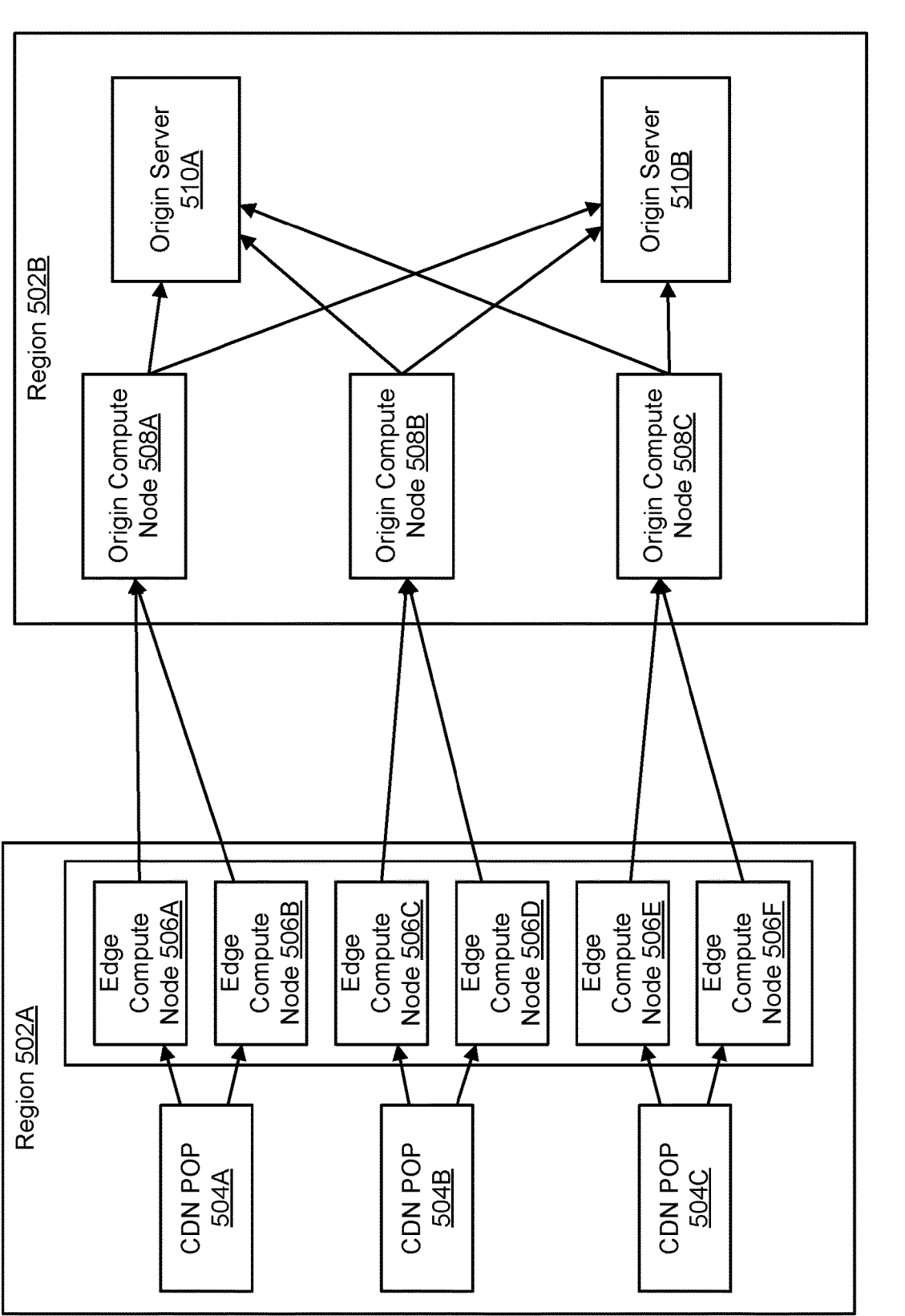
FIG. 5 illustrates an example of a system with multiple origin servers, where edge compute nodes are replicated and origin compute nodes are shared, according to an embodiment of the present disclosure.

FIG. 5 illustrates an example of a system with multiple origin servers, where edge compute nodes are replicated and origin compute nodes are shared, according to an embodiment of the present disclosure. A region 502A includes CDN POPs 504A-C and edge compute nodes 506A-F. A region 502B includes origin compute nodes 508A-C and origin servers 510A-B. Each of the origin servers 510A-B can host a web site, and the web site hosted by origin server 510A can be different than the web site hosted by origin server 510B. The edge compute nodes 506A-F being replicated and the origin compute nodes 508A-C being shared can mean that there is no sharing of network paths for web requests for the origin servers 510A-B by the edge compute nodes 506A-F, but there is sharing of network paths for web requests for the origin servers 510A-B by the origin compute nodes 508A-C.

As illustrated in FIG. 5, CDN POP 504A is communicatively coupled to edge compute nodes 506A-B. Edge compute node 506A can be associated with origin server 510A and indicate a network address of origin server 510A, while edge compute node 506B can be associated with origin server 510B and indicate a network address of origin server 510B. The edge compute nodes 506A-B are communicatively coupled to origin compute node 508A, which is communicatively coupled to the origin servers 510A-B. So, any web requests received by CDN POP 504A can be sent along a network path based on the network address of the web request, and traffic for the web sites can be isolated from each other at the edge compute nodes 506A-B, but processed together at the origin compute node 508A.

Similarly, CDN POP 504B is communicatively coupled to edge compute nodes 506C-D and CDN POP 504C is communicatively coupled to edge compute nodes 506E-F. Edge compute node 506C and edge compute node 506E can be associated with origin server 510A and indicate a network address of origin server 510A, while edge compute node 506D and edge compute node 506F can be associated with origin server 510B and indicate a network address of origin server 510B. Edge compute nodes 406C-D are communicatively coupled to origin compute node 508B and edge compute nodes 406E-F are communicatively coupled to origin compute node 508C. Origin compute nodes 508B-C are both communicatively coupled to origin servers 510A-B.

Figure 6:
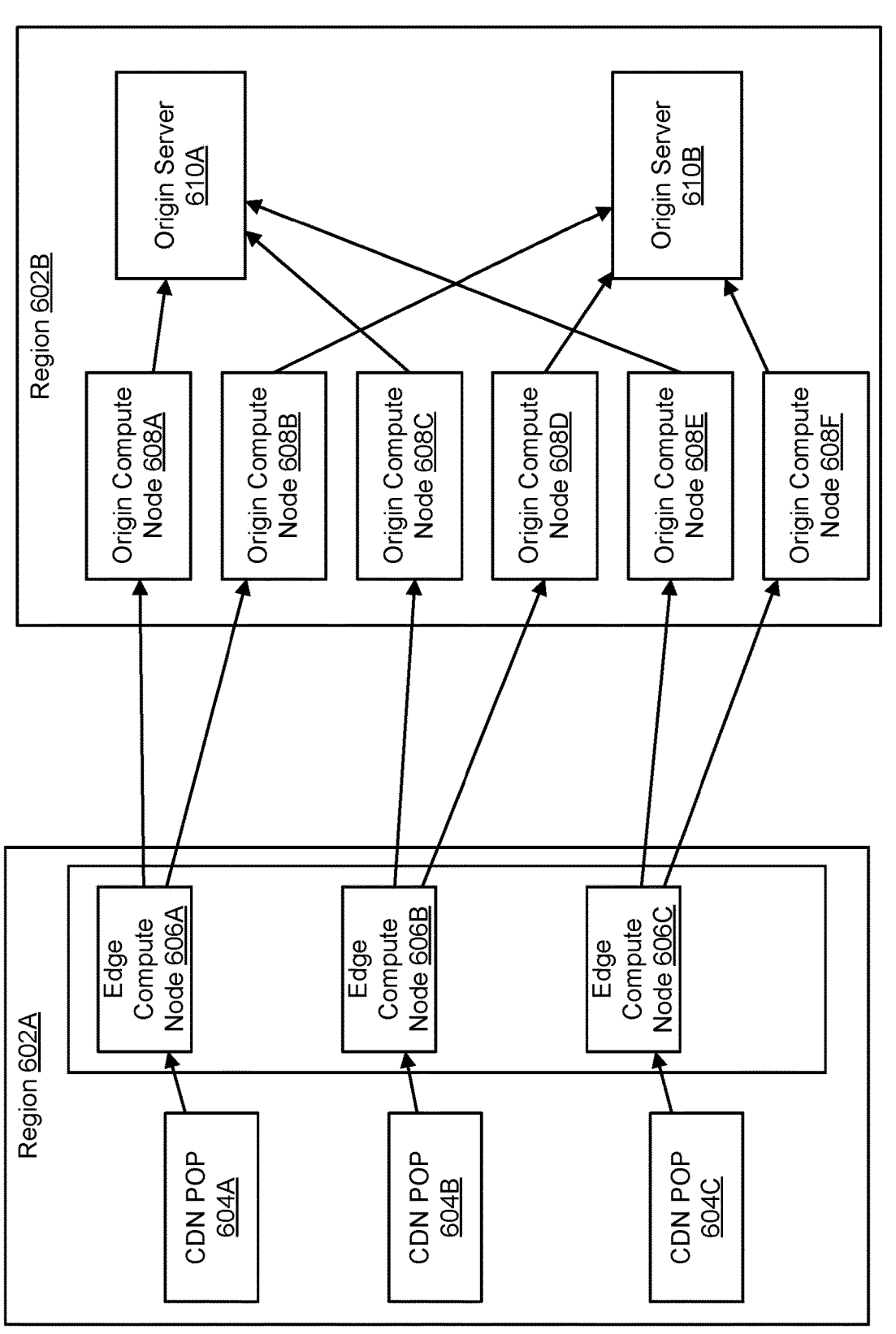
FIG. 6 illustrates an example of a system with multiple origin servers, where edge compute nodes are shared and origin compute nodes are replicated, according to an embodiment of the present disclosure.

FIG. 6 illustrates an example of a system with multiple origin servers, where edge compute nodes are shared and origin compute nodes are replicated, according to an embodiment of the present disclosure. A region 602A includes CDN POPs 604A-C and edge compute nodes 606A-C. A region 602B includes origin compute nodes 608A-F and origin servers 610A-B. Each of the origin servers 610A-B can host a web site, and the web site hosted by origin server 610A can be different than the web site hosted by origin server 610B. The edge compute nodes 606A-C being shared and the origin compute nodes 608A-F being replicated can mean that there is sharing of network paths for web requests for the origin servers 610A-B by the edge compute nodes 606A-C, but there is no sharing of network paths for web requests for the origin servers 610A-B by the origin compute nodes 608A-F.

As illustrated in FIG. 6, CDN POP 604A is communicatively coupled to edge compute nodes 606A. Edge compute node 606A can be associated with the origin servers 610A-B and indicate network addresses of each of the origin servers 610A-B. The edge compute node 606A is communicatively coupled to origin compute nodes 608A-B. Origin compute node 608A can be associated with origin server 610A and indicate the network address of origin server 610A, while origin compute node 608B can be associated with origin server 610B and indicate the network address of origin server 610B. So, origin compute node 608A is communicatively coupled to origin server 610A and origin compute node 608B is communicatively coupled to origin server 610B. So, any web requests received by CDN POP 604A can be sent along a network path based on the network address of the web request, and traffic for the web sites can be processed together at the edge compute node 606A, but isolated from each other at the origin compute nodes 608A-B.

Similarly, CDN POP 604B is communicatively coupled to edge compute node 606B and CDN POP 604C is communicatively coupled to edge compute node 606C. Edge compute node 606B is communicatively coupled to origin compute nodes 608C-D and edge compute node 606C is communicatively coupled to origin compute nodes 608E-F. Origin compute nodes 608C/608E can be communicatively coupled with origin server 610A, while origin compute nodes 608D/608F can be communicatively coupled with origin server 610B.

Figure 7:
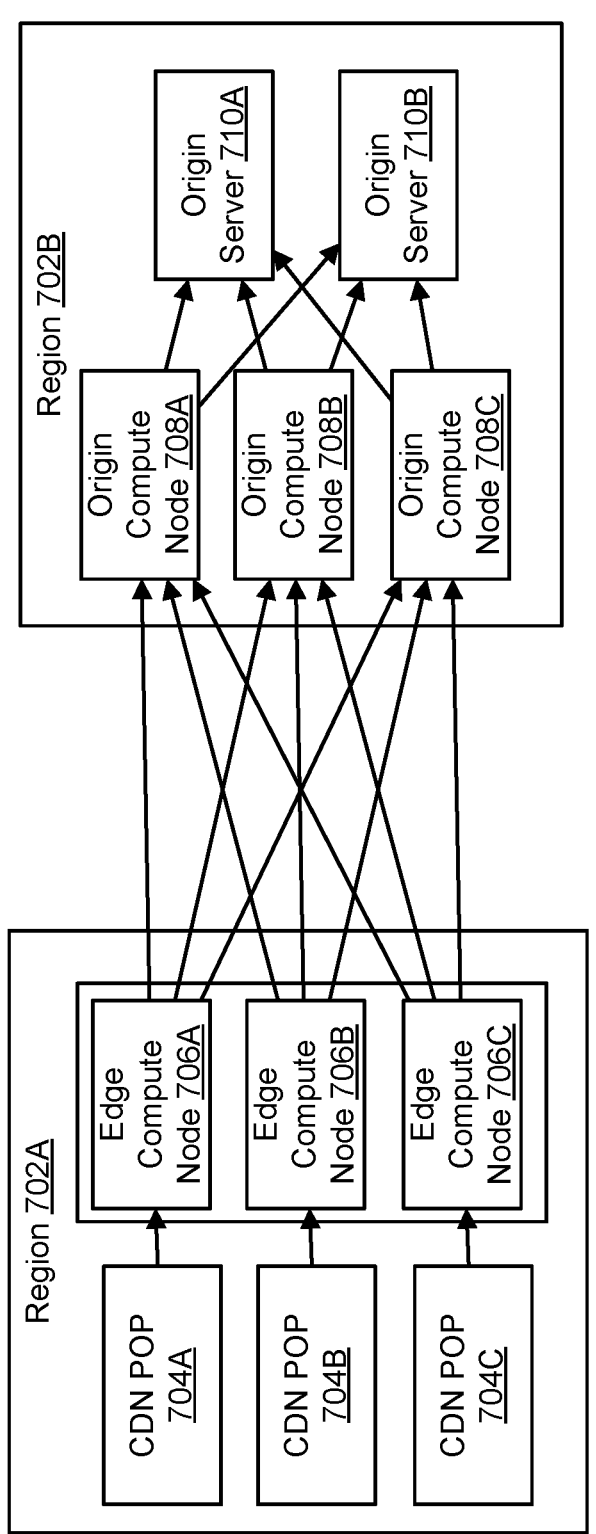
FIG. 7 illustrates an example of a system with multiple origin servers, where edge compute nodes and origin compute nodes are shared, according to an embodiment of the present disclosure.

FIG. 7 illustrates an example of a system with multiple origin servers, where edge compute nodes and origin compute nodes are shared, according to an embodiment of the present disclosure. A region 702A includes CDN POPs 704A-C and edge compute nodes 706A-C. A region 702B includes origin compute nodes 708A-C and origin servers 710A-B. Each of the origin servers 710A-B can host a web site, and the web site hosted by origin server 710A can be different than the web site hosted by origin server 710B. The edge compute nodes 706A-C and the origin compute nodes 708A-C being shared can mean that there is sharing of network paths for web requests for the origin servers 710A-B by the edge compute nodes 706A-C and the origin compute nodes 708A-C.

As illustrated in FIG. 7, CDN POP 704A is communicatively coupled to edge compute nodes 706A. Edge compute node 706A can be associated with the origin servers 710A-B and indicate network addresses of each of the origin servers 710A-B. The edge compute node 706A is communicatively coupled to origin compute node 708A. Origin compute node 708A can be communicatively coupled to the origin servers 710A-B. So, any web requests received by CDN POP 704A can be sent along a network path based on the network address of the web request, and traffic for the web sites can be processed together at the edge compute node 706A and the origin compute node 708A.

Similarly, CDN POP 704B is communicatively coupled to edge compute node 706B and CDN POP 704C is communicatively coupled to edge compute node 706C. Edge compute node 706B is communicatively coupled to origin compute node 708B and edge compute node 706C is communicatively coupled to origin compute node 708C. Each of the origin compute nodes 708B-C can be communicatively coupled with each of the origin servers 710A-B.

Figure 8:
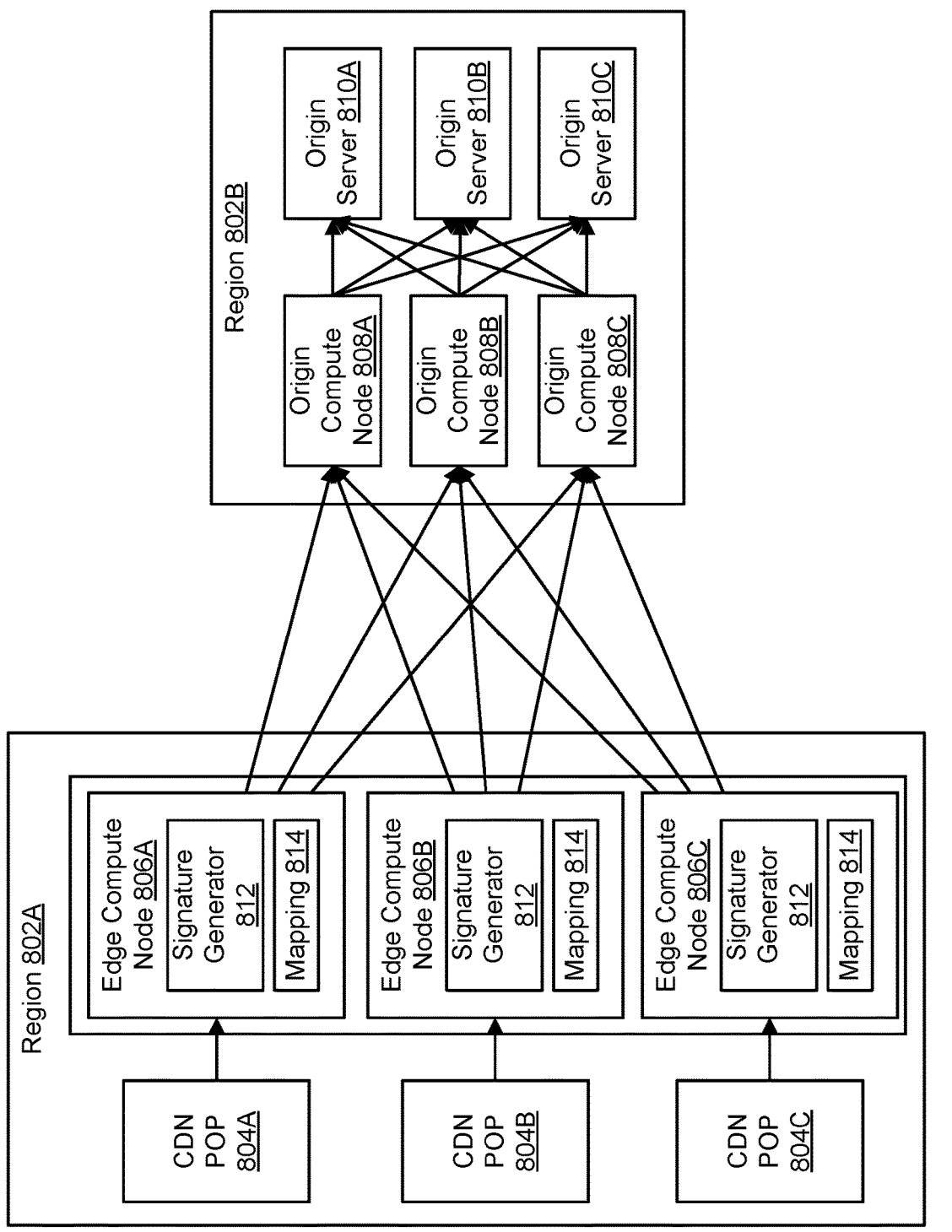
FIG. 8 illustrates an example of edge compute nodes performing a mapping of web requests to origin compute nodes, according to an embodiment of the present disclosure.

FIG. 8 illustrates an example of edge compute nodes performing a mapping of web requests to origin compute nodes, according to an embodiment of the present disclosure. A region 802A includes CDN POPs 804A-C and edge compute nodes 806A-C. Each of the edge compute nodes 806A-C includes a signature generator 812 and a mapping 814 for determining where to send web requests. A region 802B includes origin compute nodes 808A-C and origin servers 810A-C. Each of the origin servers 810A-B can host a web site, which may all be different from one another.

In an example, when an edge compute node (e.g., edge compute node 806B) receives a web request for a web site, such as the web site hosted by origin server 810B, the edge compute node 806B can determine to which of the origin compute nodes 808A-C the web request is to be sent. The edge compute node 806B can determine data (e.g., the mapping 814) to send the web request along a network path to the origin server 810B. The signature generator 812 of the edge compute node 806B can determine a set of characteristics of the web request. For instance, the set of characteristics may be based on an identifier of a device from which the web request was received or other client application attributes of the requesting application, on header information of the web request, or credential information associated with the device and/or application, and/or on information associated with a security protocol used for making the web request. In an example, the signature generator 812 generates a signature based on the set of characteristics, such as a hash generated by hashing the web request (or a portion(s) thereof). The mapping 814 can be a mapping between sets of characteristics and identifiers of the origin compute nodes 808A-C. For instance, the mapping 814 can associate a first hash with origin compute node 808A, a second hash with origin compute node 808B, and a third hash with origin compute node 808C. So, based on the mapping 814, the edge compute node 806B can determine the identifier of the origin compute node (e.g., origin compute node 808C) to which the web request is to be sent. The edge compute node 806B can then send the web request to the origin compute node 808C based on the identifier.

In an example, each set of characteristics can be mapped to a single origin compute node. A size of each of the origin compute nodes 808A-C may be based on how frequently the set of characteristics associated with the origin compute node 808A-C is found across web traffic. For instance, if origin compute node 808A is associated with a set of characteristics that occurs more frequently across the web traffic than a set of characteristics associated with origin compute node 808B, then origin compute node 808A may have a larger size, or processing capacity, than origin compute node 808B.

Figure 9:
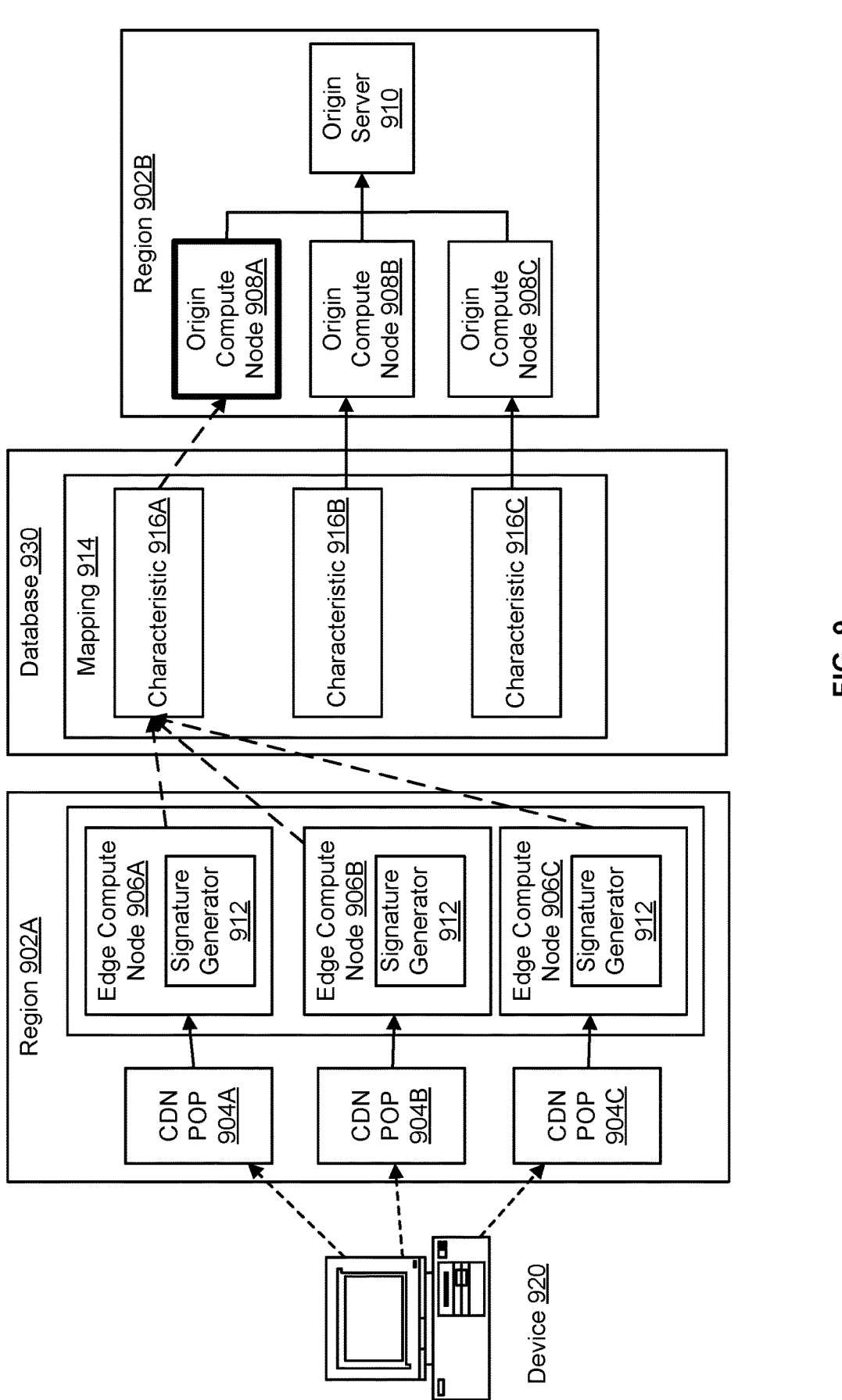
FIG. 9 illustrates an example of edge compute nodes and a server performing a mapping of web requests to origin compute nodes, according to an embodiment of the present disclosure.

FIG. 9 illustrates an example of edge compute nodes and a server performing a mapping of web requests to origin compute nodes, according to an embodiment of the present disclosure. A region 902A includes CDN POPs 904A-C and edge compute nodes 906A-C. A region 902B includes origin compute nodes 908A-C and origin server 910. The edge compute nodes 906A-C and the origin compute nodes 908A-C are communicatively coupled to a database 930, which may be a DNS database. The database 930 can include servers that operate as a distributed repository. In some instances, the database 930 may include one server for each of the edge compute nodes 906A-C.

In an example, when the edge compute nodes 906A-C receive a web request for a web site hosted by the origin server 910, a signature generator 912 of the edge compute nodes 906A-C can determine a set of characteristics of the web request. As explained herein above, the set of characteristics may be based on an identifier of a device from which the web request was received or other client application attributes of the requesting application, on header information of the web request, or credential information associated with the device and/or application, and/or on information associated with a security protocol used for making the web request. The signature generator 912 may generate a hash of the web request (or a portion(s) thereof). The edge compute nodes 906A-C can then forward the web request to the database 930, which can determine to which of the origin compute nodes 908A-C the web request is to be sent. To do so, the database 930 can store a mapping 914 for sending the web request along a network path to the origin server 910. The mapping 914 can be a mapping between characteristics 916A-C and an identifier of an origin compute node of the origin compute nodes 908A-C. For instance, the mapping 1014 can associate characteristic 916A with origin compute node 908A, characteristic 916B with origin compute node 908B, and characteristic 916C with origin compute node 908C. So, based on the mapping 914, the database 930 can determine the identifier of the origin compute node to which the web request is to be sent. The server 930 can indicate to the edge compute nodes 906A-C to which origin compute node to send the web request based on the identifier. The edge compute nodes 906A-C may only send the web request to the database 930 if the corresponding edge compute node does not have the mapping for the determined set of characteristics stored in a cache. Otherwise, the edge compute nodes 906A-C can determine the mapping from the cache and determine which origin compute node should receive the web request.

In an example, a device 920 sends web requests for the web site hosted by the origin server 910 to each of the CDN POPs 904A-C. The network address of the origin server 910 indicated by the CDN POPs 904A-C can be used in the web requests to request the web site. The device 920 may be a botnet attempting a DOS attack on the origin server 910, so the device 920 may send a high number of web requests for the web site with the intention of bringing down the web site.

The number of web requests received by each edge compute node 906A-C can within the processing capacity of the edge compute node 906A-C, so the signature generator 912 of each of the edge compute nodes 906A-C can generate hashes for each web request. The edge compute nodes 906A-C can then forward the hashes to the database 930, which determines that each web request from the device 920 has a hash corresponding to the characteristic 916A, which is associated with origin compute node 908A in the mapping 914. So, the web requests from the device 920 can all be sent to the origin compute node 908A. The origin compute node 908A may fail and prevent sending the web requests if the processing capacity of the origin compute node 908A is insufficient for handling the received web requests.

Figure 10:
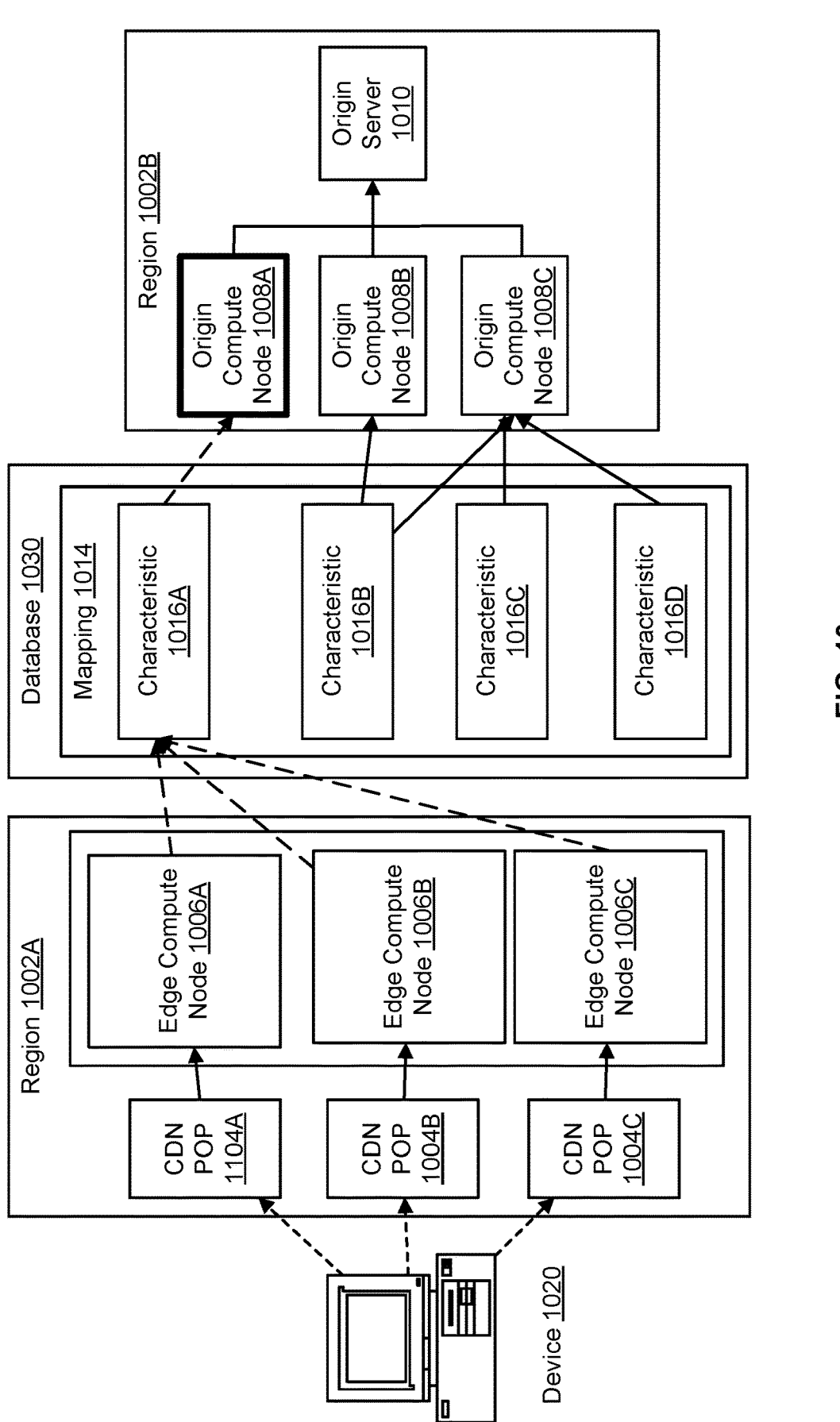
FIG. 10 illustrates an example of multiple sets of characteristics for requests being mapped to a same origin compute node, according to an embodiment of the present disclosure.

FIG. 10 illustrates an example of multiple sets of characteristics for requests being mapped to a same origin compute node, according to an embodiment of the present disclosure. A region 1002A includes CDN POPs 1004A-C and edge compute nodes 1006A-C. A region 1002B includes origin compute nodes 1008A-C and origin server 1010. The edge compute nodes 1006A-C and the origin compute nodes 1008A-C are communicatively coupled to a database 1030, which may be a DNS database. The database 1030 can include servers that operate as a distributed repository. In some instances, the database 1030 may include one server for each of the edge compute nodes 1006A-C.

In an example, when the edge compute nodes 1006A-C receive a web request for a web site hosted by the origin server 1010, the edge compute nodes 1006A-C either determine a set of characteristics of the web request, or the edge compute nodes 1006A-C forward the web request to the database 1030 that determines the set of characteristics of the web request. The database 1030 stores a mapping 1014 between characteristics 1016A-D and an identifier of an origin compute node of the origin compute nodes 1008A-C. Each characteristic 1016A-D may map to one or more origin compute nodes 1008A-C, and each origin compute node 1008A-C may map to one or more characteristics 1016A-D. For instance, characteristic 1016A is illustrated as mapping to origin compute node 1008A, characteristic 1018B is illustrated as mapping to origin compute nodes 1008B-C, characteristic 1016C is illustrated as mapping to origin compute node 1008C, and characteristic 1016D is illustrated as mapping to origin compute node 1008C. The edge compute nodes 1006A-C may only send the web request to the database 1030 if the corresponding edge compute node does not have the mapping for the determined set of characteristics stored in a cache. Otherwise, the edge compute nodes 1006A-C can determine the mapping from the cache and determine which origin compute node should receive the web request.

In an example, a device 1020 sends web requests for the web site hosted by the origin server 1010 to each of the CDN POPs 1004A-C. The network address of the origin server 1010 indicated by the CDN POPs 1004A-C can be used in the web requests to request the web site. The device 1020 may be a botnet attempting a DOS attack on the origin server 1010, so the device 1020 may send a high number of web requests for the web site with the intention of bringing down the web site.

The number of web requests received by each edge compute node 1006A-C can be within the processing capacity of the edge compute node 1006A-C, so hashes can be generated for each web request. The edge compute nodes 1006A-C can then forward the hashes to the database 1030, which determines that each web request from the device 1020 has a hash corresponding to the characteristic 1016A, which is associated with origin compute node 1008A in the mapping 1014. So, the web requests from the device 1020 can all be sent to the origin compute node 1008A. The origin compute node 1008A may fail and prevent sending the web requests if the processing capacity of the origin compute node 1008A is insufficient for handling the received web requests.

Figure 11:
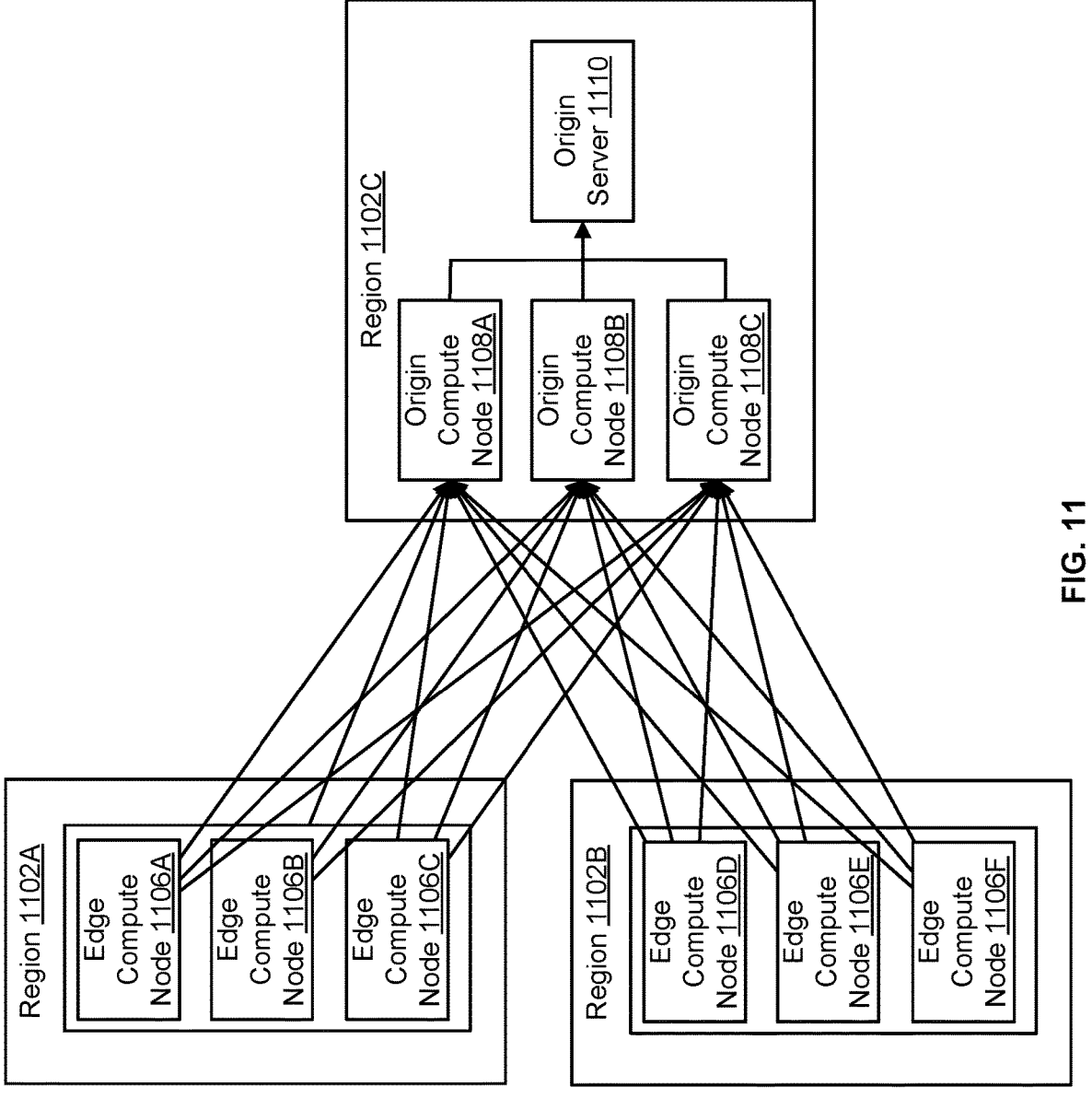
FIG. 11 illustrates another example of an infrastructure of data servers for hosting and providing computing services, according to an embodiment of the present disclosure.

FIG. 11 illustrates another example of an infrastructure of data servers for hosting and providing computing services, according to an embodiment of the present disclosure. As illustrated, a first data center includes edge compute nodes 1106A-C and is located in a region 1102A, a second data center includes edge compute nodes 1106D-F and is located in region 1102B, and a third data center includes origin compute nodes 1108A-C and origin server 1110 and is located in region 1102C. Each of the data centers can be communicatively coupled via a network. The edge compute nodes 1106A-F and the origin compute nodes 1108A-C may be configured as proxy servers. To mitigate DOS attacks, the processing capacity (e.g., CPU capacity, number of concurrent network connections, memory capacity, etc.) of the edge compute nodes 1106A-F and the origin compute nodes 1108A-C can be set so that receiving a number of requests greater than the processing capacity is able to handle results in failure of the corresponding edge compute node 1106A-F or origin compute node 1108A-C.

The edge compute nodes 1106A-F can indicate a network address of the origin server 1110, which hosts a web site. A client of a device may send a web request for the web site using the network address of the origin server 1110. A router, gateway, or other network device may receive the web request and direct the web request to an edge compute node based on a geographical location of the device. For instance, the web request may be directed to the edge compute node 1104A, and the edge compute node 1104A can include a translation table (or some other mapping information) that that indicates the web request for the web site is to be sent to origin compute node 1108A. The web request may be sent from the edge compute node 1106A to the origin compute node 1108A based on data that associates a set of characteristics of the web request with an identifier of the origin compute node 1108A. The data may be a hash of traffic information of the web request. The edge compute node 1106A forwards the web request to the origin compute node 1108A. Similarly, the origin compute node 1108A includes a translation table that indicates the web request for the web site is to be sent to the origin server 1110. The origin compute node 1108A forwards the web request to the origin server 1110.

FIG. 12 illustrates an example flow of an edge compute node performing DOS attack mitigation, according to an embodiment of the present disclosure. Some or all of the processes (or any other processes described herein, or variations, and/or combinations thereof) may be performed under the control of one or more edge compute nodes, such as the edge compute node 104A in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 1202, where the edge compute node receives a request of a POP that is located in a first region. The edge compute node can also be located in the first region and communicatively coupled to the POP. The request can indicate a network address of a server that is located in a second region. The edge compute node can have a smaller capacity to handle requests than the POP.

In an example, the flow includes operation 1204, where the edge compute node determines data to send the request along a network path to the server. The data may be a mapping either between sets of characteristics of requests and identifiers of other compute nodes that are located in the second region. Or the data may be a translation table between the edge compute node and the other compute nodes.

In an example, the flow includes operation 1206, where the edge compute node determines, based on the data, that the request is to be sent to a second compute node that is located in the second region. The second compute node may be an origin compute node that is communicatively coupled to the server. The second compute node can have a smaller capacity to handle requests than the server. The edge compute node may alternatively determine that the request is to be sent to a third compute node that determines the origin compute node.

In an example, the flow includes operation 1208, where the edge compute node sends the request along the network path based on the data. For instance, the edge compute node may send the request to the second compute node, which can then send the request to the server. Or, the edge compute node may send the request to the third compute node, which can then send the request to the second compute node, which in turn sends the request to the server. The edge compute node may forego sending the request if the edge compute node has insufficient processing capacity to send the request.

In an example, the flow includes operation 1210, where the edge compute node receives additional requests and causes a failure. When there is a DOS attack, the edge compute node receives a large volume of requests exceeding the processing capacity of the edge compute node, causing the edge compute node to fail. Because of the failure, the requests are no longer sent, thereby foregoing the additional processing and transmission of the requests and responses that would have been received back. As a result, the impact of the DOS attack to the traffic is limited via the edge compute node, rather than bringing the server down by overloading it with the large number of requests.

FIG. 13 illustrates an example flow of an origin compute node performing DOS attack mitigation, according to an embodiment of the present disclosure. Some or all of the processes (or any other processes described herein, or variations, and/or combinations thereof) may be performed under the control of one or more origin compute nodes, such as the origin compute node 108A in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 1302, where the origin compute node, which is located in a first region, receives a request of a POP that is located in a second region. The POP is communicatively coupled to a second compute node, which may be an edge compute node located in the second region. The origin compute node receives the request from the second compute node. The request can indicate a network address of a server that is located in the first region and communicatively coupled to the origin compute node. The origin compute node can have a smaller capacity to handle requests than the server.

In an example, the flow includes operation 1304, where the origin compute node determines data to send the request along a network path to the server. The data may be an IP address of the server that is included in the request. The origin compute node can determine that the data indicates that the request is to be sent to the server.

In an example, the flow includes operation 1306, where the origin compute node sends the request along the network path based on the data. For instance, the origin compute node can send the request to the server based on the data indicating the IP address.

In an example, the flow includes operation 1308, where the origin compute node receives additional requests and causes a failure. When there is a DOS attack, the origin compute node receives a large volume of requests exceeding the processing capacity of the origin compute node, causing the origin compute node to fail. Because of the failure, the requests are no longer sent, thereby foregoing the additional processing and transmission of the requests and responses that would have been received back. As a result, the impact of the DOS attack to the traffic is limited via the origin compute node, rather than bringing the server down by overloading it with the large number of requests.

Figure 14:
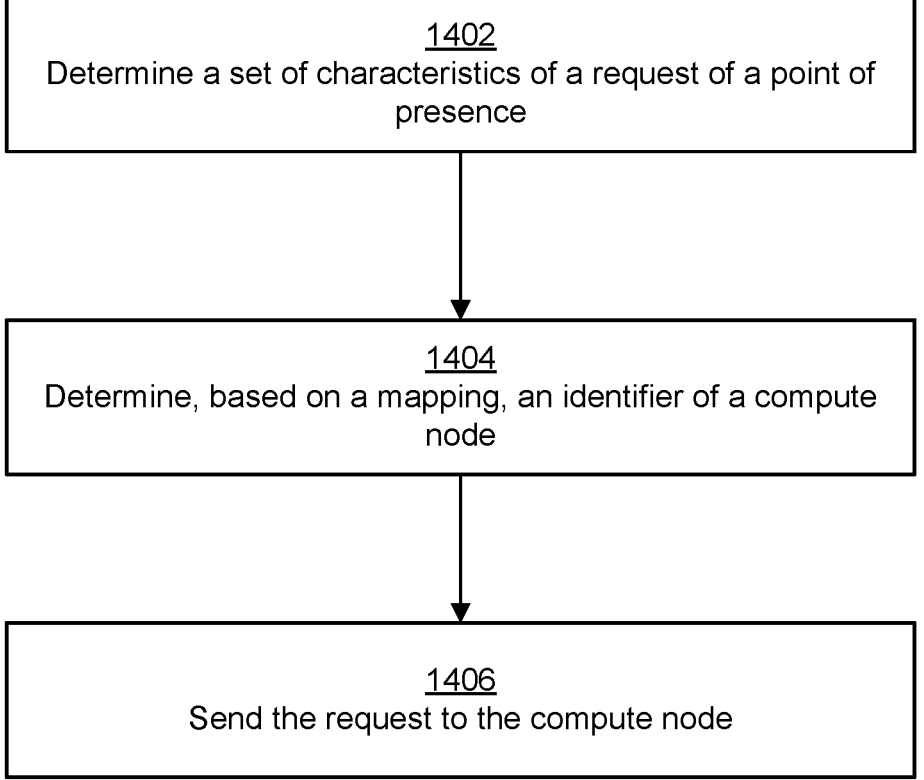
FIG. 14 illustrates an example flow of a compute node performing DOS attack mitigation, according to an embodiment of the present disclosure.

FIG. 14 illustrates an example flow of a compute node performing DOS attack mitigation, according to an embodiment of the present disclosure. Some or all of the processes (or any other processes described herein, or variations, and/or combinations thereof) may be performed under the control of one or more compute nodes, such as server 930 in FIG. 9, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 1402, where the server determines a set of characteristics of a request of a POP. The server may be communicatively coupled to a first compute node from which the request is received (e.g., an edge compute node). The first compute is communicatively coupled with the POP and has a smaller processing capacity than the POP. The set of characteristics may be a hash of traffic information of the request. The server may generate the set of characteristics, or the set of characteristics may be received from the first compute node.

In an example, the flow includes operation 1404, where the server determines, based on a mapping, an identifier of a second compute node (e.g., an origin compute node). The mapping is data that associates the set of characteristics of the request with the identifier of the second compute node. Each set of characteristics may be associated with a single compute node, or sets of characteristics may be associated with multiple compute nodes. The second compute node can be communicatively coupled with another server that hosts a web site of the request.

In an example, the flow includes operation 1406, where the server sends the request to the second compute node. The server can send the request to the second compute node based on the mapping. The second compute node can then send the request to the other server that hosts the web site.

Figure 15:
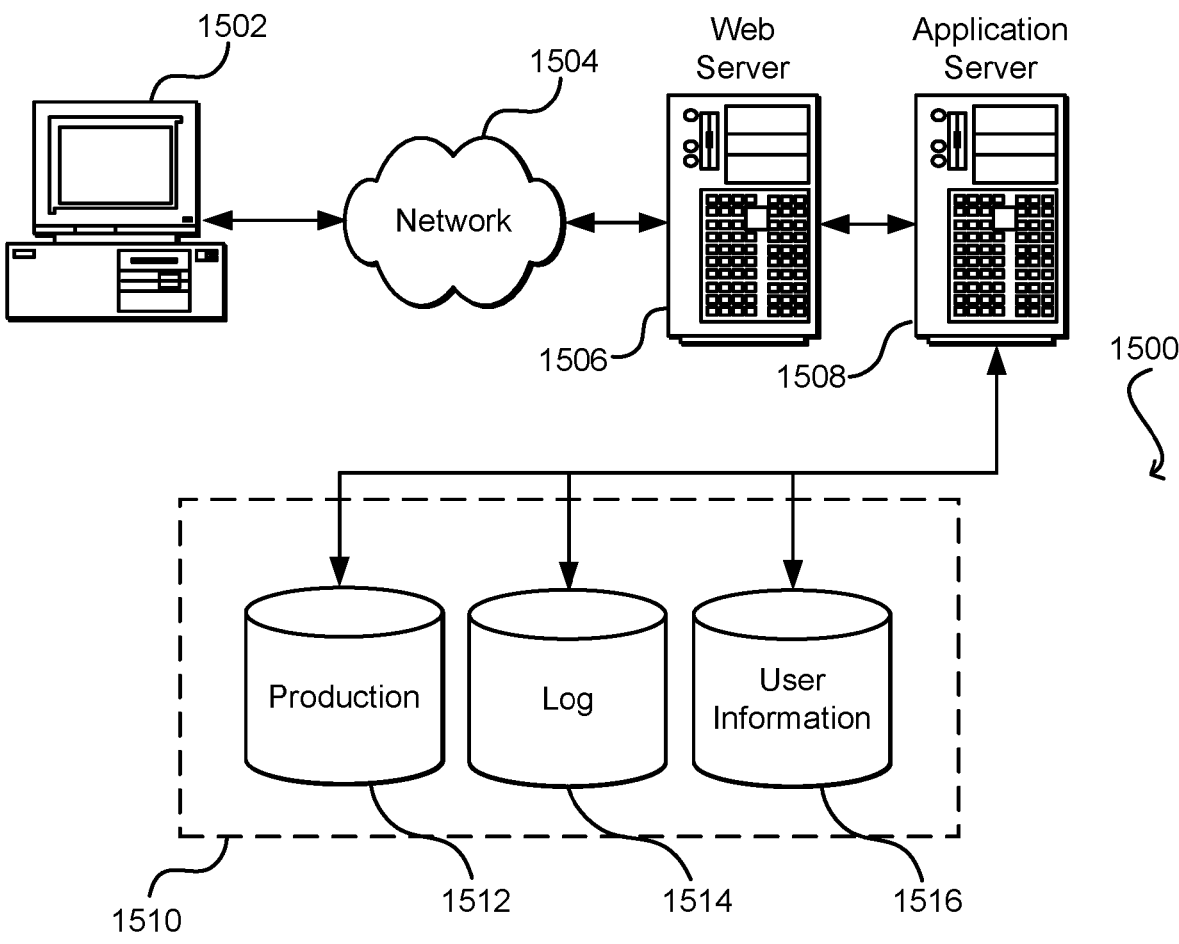
FIG. 15 illustrates aspects of an example environment for implementing aspects in accordance with various embodiments.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from OracleR, MicrosoftR, SybaseR, and IBMR.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
an origin server located in a first region and configured to host a web site;
a first compute node located in the first region and communicatively coupled with the origin server;
a second compute node located in a second region and communicatively coupled with the first compute node; and
a first content data network (CDN) point of presence (POP) located in the second region, communicatively coupled with the second compute node, and configured to indicate a first internet protocol (IP) address of the origin server,
wherein the second compute node is configured to:
receive, from the first CDN POP, a plurality of web requests corresponding to a distributed denial-of-service (DDoS) attack, the plurality of web requests associated with a client signature and requesting the web site based at least in part on the first IP address;
determine, based at least in part on the plurality of web requests sharing the client signature, to send the plurality of web requests to the first computing node instead of the origin server, wherein the first compute node has a smaller processing capacity than the origin server and is configured to not automatically scale in response to exceeding the smaller processing capacity; and
send the plurality of web requests to the first compute node instead of origin server, thereby causing the first compute node to fail such that the DDoS attack fails to reach the web site.

2. The system of claim 1, further comprising:
a third compute node located in the second region, communicatively coupled with the first compute node, and isolated from the second compute node; and a second CDN POP located in the second region, communicatively coupled with the third compute node, and configured to indicate the first IP address or a second IP address of the origin server, wherein:
the third compute node has a smaller processing capacity than the second CDN POP,
the third compute node is configured to receive, from the second CDN POP, web requests requesting the web site based at least in part on the first IP address or the second IP address, and
the third compute node is further configured to fail sending the web requests based at least in part on the smaller processing capacity of the third compute node being insufficient to handle the web requests.

3. The system of claim 1, further comprising:
a third compute node located in the first region, communicatively coupled with the origin server and with a plurality of compute nodes in the second region, and isolated from the first compute node, wherein:
the third compute node has a smaller processing capacity than the origin server,
the third compute node is configured to receive web requests each sent from one of the plurality of compute nodes, and
the third compute node is further configured to fail sending the web requests to the origin server based at least in part on the smaller processing capacity of the third compute node being insufficient to handle the web requests.

4. The system of claim 1, wherein a first web request of the plurality of web requests is sent from the second compute node to the first compute node based at least in part on data that associates a set of characteristics of the first web request with an identifier of the first compute node.

5. A computer-implemented method comprising:
receiving, by a first compute node located in a first region, first requests indicating a first network address of a first server that is located in the first region or a second region and corresponding to a distributed denial-of-service (DDoS) attack;
determining, based at least in part on the first requests sharing a client signature, to send the first requests to a second computing node instead of the first server, wherein the second compute node has a smaller processing capacity than the first server and is configured to not automatically scale in response to exceeding the smaller processing capacity; and
sending, by the first compute node, the first requests to the second computing node instead of the first server, thereby causing the second computing node to fail such that the DDoS attack fails to reach the first server.

6. The computer-implemented method of claim 5, further comprising:
determining that a second request is to be sent to a third compute node that is located in the second region, is communicatively coupled with the first server that is located in the second region, and has a smaller capacity to handle requests than the first server, and wherein the second request is sent from the first compute node to the third compute node.

7. The computer-implemented method of claim 5, further comprising:
determining a second request is to be sent to the first server, wherein the second request is received from a third compute node that is located in the second region, wherein the first server is located in the first region, and wherein the second request is sent from the first compute node to the first server.

8. The computer-implemented method of claim 5, wherein the second compute node is located in the first region and the first server is located in the second region, wherein the first compute node and the second compute node are communicatively coupled with a point of presence (POP) located in the first region, wherein the first requests are sent from the POP to the first compute node and second requests are sent from the POP to the second compute node, and wherein the first compute node and the second compute node are communicatively coupled to a third compute node located in the second region and has a third smaller capacity to handle requests than the first server.

9. The computer-implemented method of claim 5, further comprising:

determining a set of characteristics of a second request;

determining, based at least in part on the set of characteristics, an identifier of a third compute node; and sending, based at least in part on the identifier, the second request to the third compute node, wherein the third compute node is located in the second region and is communicatively coupled with the first server.

10. The computer-implemented method of claim 5, further comprising:

sending a second request to a third compute node based at least in part on a hash of the second request, and wherein the third compute node is located in the second region, is communicatively coupled with the first server, and has a capacity that is based at least in part on a number of requests that are associated with the hash.

11. The computer-implemented method of claim 5, further comprising:

determining, by the first compute node based at least in part on a second request, a set of characteristics of the second request; and sending, by the first compute node, the second request to a database, wherein the database is configured to:

store a mapping that associates a set of characteristics of the second request and an identifier of a third compute node;

determine the set of characteristics based at least in part on the second request;

determine, based at least in part on the mapping, the identifier of the third compute node; and send, based at least in part on the identifier, the second request to the third compute node, and wherein the third compute node is located in the second region and is communicatively coupled with the first server.

12. The computer-implemented method of claim 5, further comprising:

receiving, by the second compute node, second requests indicating the first network address within a time unit, wherein the second compute node is configured to fail sending the second requests to the first server based at least in part on the smaller capacity being insufficient to handle the second requests.

13. A system comprising:

a first point of presence (POP) that is located in a first region;

a first server that is located in a second region; and a first compute node that is located in the first region and communicatively coupled with the first POP or that is located in the second region and communicatively coupled with the first server, has a smaller capacity to handle requests than each of the first POP and the first server, and is configured to:

receive first requests of the first POP, the first requests indicating a first network address of the first server and corresponding to a distributed denial-of-service (DDoS) attack;

determine, based at least in part on the first requests sharing a client signature, to send the first requests to a second computing node instead of the first server, wherein the second compute node has a smaller processing capacity than the first server and is configured to not automatically scale in response to exceeding the smaller processing capacity; and send the first requests to the second computing node instead of the first server, thereby causing the second compute node to fail such that the DDos attack fails to reach the first server.

14. The system of claim 13, further comprising:

a second POP that is located in the first region or a third region; and the second compute node that is co-located with the second POP, is communicatively coupled with the second POP, and has a smaller capacity to handle second requests of the second POP than the second POP, wherein the first compute node is co-located with the first POP and is isolated from the second compute node and the second POP.

15. The system of claim 13, further comprising:

the second compute node that is co-located with the first POP, communicatively coupled with the first POP, and isolated from the first compute node, wherein the first POP is configured to send the first requests for a first web site to the first compute node and second requests for a second web site to the second compute node, and wherein the second compute node has a smaller capacity to handle the second requests than the first POP.

16. The system of claim 13, further comprising:

a second server that is located in the second region;

the second compute node that is located in the first region and communicatively coupled with the first POP or that is located in the second region and communicatively coupled with the second server, has a smaller capacity to handle second requests than each of the first POP and the second server, and is configured to:

receive a second request of the first POP, the second request indicating a second network address of the second server; and send the second request along a second network path to the second server.

17. The system of claim 13, further comprising:

a second server that is located in the second region, wherein the first compute node is further configured to:

receive a second request of the first POP, the second request indicating a second network address of the second server; and send the second request to the second server.

18. The system of claim 13, wherein the smaller capacity is defined based at least in part on first expected requests of the first POP during a time interval or second expected requests destined to the first server during the time interval.

19. The system of claim 13, wherein the system is configured to store a mapping, and wherein the mapping further associates multiple sets of request characteristics to an identifier of the second compute node.

20. The system of claim 19, wherein the system is configured to:

determine a set of characteristics of a first request of the first requests;

determine, based at least in part on the mapping and the set of characteristics, an identifier of the second compute node; and send, based at least in part on the identifier, the first request to the second compute node.

\* \* \* \* \*